UNITED STATES PATENT OFFICE.

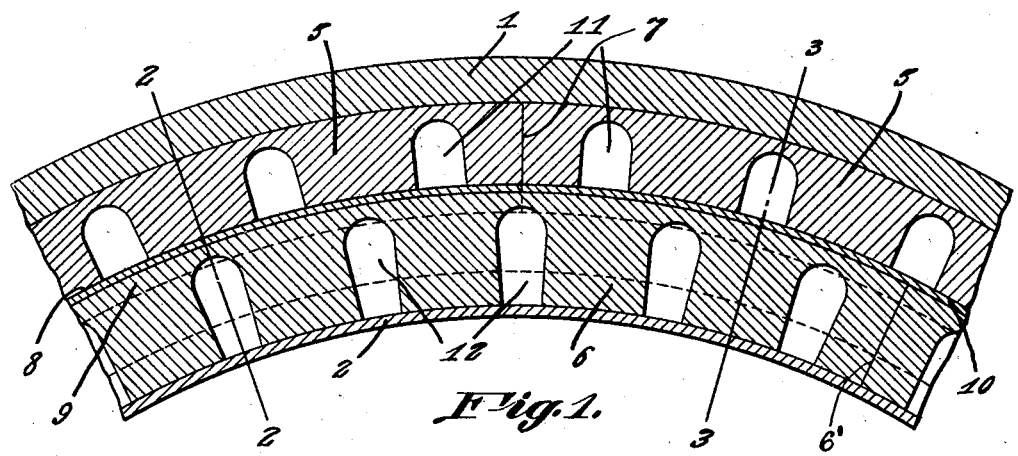

JOHN W. BURGESS AND GEORGE F. BURGESS, OF KANSAS CITY, MISSOURI.

INNER-TUBE CUSHION.

1,407,730.

Specification of Letters Patent.  Patented Feb. 28, 1922.

Application filed April 2, 1920. Serial No. 370,875.

*To all whom it may concern:*

Be it known that we, JOHN W. BURGESS and GEO. F. BURGESS, citizens of the United States, residing at Kansas City, in the county of Jackson, State of Missouri, have invented a new and useful Inner-Tube Cushion, of which the following is a specification.

It is the object of this invention to provide a tire filler which will resist puncture, novel means being provided for preventing an overheating of the parts of the filler, the construction of the filler being such that one part of the same may be replaced, when worn or damaged, independently of the other part thereof, means being provided whereby relative lateral movement between the parts of the filler will be prevented.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, embodied with a rim and tire casing; Figure 2 is a cross section on the line 2—2 of Figure 1; Figure 3 is a cross section on the line 3—3 of Figure 1.

The numeral 1 denotes a tire casing which may be connected with a rim 2 in any desired way. In the present embodiment of the invention, the casing 1 has clincher beads 3 cooperating with clincher flanges 4 on the rim 2. Disposed within the casing 1 is a filler including any desired number of outer strips 5 and any desired number of inner strips 6, the ends 7 of the strips 5 being disposed in break joint order with respect to the ends 6' of the strips 6, a construction which will be understood readily from Figure 1 of the drawings. The strips 5 and 6 may be of any desired length. The strip 5 has a circumferential groove 8, preferably of rectangular cross section, the strip 6 having a tongue 9 fitting in the groove, the groove and the tongue extending circumferentially of the device. A strip of refractory material, preferably asbestos, denoted by the numeral 10, is located in the groove 8 and is held therein by the tongue 9. The strip 10 of refractory material prevents an overheating of the tire, the engagement between the tongue 9 and the groove 8 serving to prevent relative lateral movement between the strips 5 and 6. Recesses 11 are fashioned in the member 5 and are closed at their inner ends by the refractory strip 10. Recesses 12 are formed in the member 6 and are closed at their inner ends by the rim 2, the recesses 11 and 12 alternating, circumferentially of the tire. If desired, the recesses 12 may taper as they extend inwardly.

The general construction of the device is such that it will possess great resiliency, combined with strength sufficient to withstand puncture and other injuries. The members 6 and 5 preferably are made from a good grade of rubber. If the tread or outer strips 5 become damaged, they can be renewed readily, without necessitating a renewal of the inner members 6.

Having thus described the invention, what is claimed is:—

In a device of the class described, a rim; a casing mounted on the rim; and a filler in the casing, the filler being made up of outer and inner members, each including sections disposed end to end, the joints between the ends of the sections of the outer member being disposed in break-joint order with respect to the joints between the ends of the sections of the inner member, the outer member having a circumferential groove and the inner member having a circumferential rib received in the groove, the outer member having recesses, and the inner member having recesses, the recesses in one member alternating with the recesses of the other membr, circumferentially of the casing; and a refractory strip located in the groove and held therein by the rib, the strip forming a closure for the inner ends of the recesses in the outer member, and the rim constituting a closure for the inner ends of the recesses in the inner member.

In testimony that we claim the foregoing as our own, we have hereto affixed our signatures in the presence of two witnesses.

JOHN W. BURGESS.
GEORGE F. BURGESS.

Witnesses:
E. STEPHENSON,
C. O. BURGESS.